United States Patent [19]

Shimizu et al.

[11] Patent Number: 5,115,238
[45] Date of Patent: May 19, 1992

[54] CALIBRATION APPARATUS OF ANGULAR VELOCITY SENSOR IN SELF-CONTAINED NAVIGATIONAL SYSTEM

[75] Inventors: Osamu Shimizu; Kenji Tenmoku; Yoichi Doi; Kunihiko Mito, all of Osaka, Japan

[73] Assignee: Sumitomo Electric Industries, Ltd., Osaka, Japan

[21] Appl. No.: 502,551

[22] Filed: Apr. 2, 1990

[30] Foreign Application Priority Data

Apr. 7, 1989 [JP] Japan ................................ 1-88440

[51] Int. Cl.⁵ ............................................. G08G 1/123
[52] U.S. Cl. .................................. 340/988; 73/178 R; 340/995; 364/449
[58] Field of Search .......................... 340/988, 995, 990; 73/178 R; 364/443, 449, 444, 457, 460

[56] References Cited

U.S. PATENT DOCUMENTS

| | | | |
|---|---|---|---|
| 4,470,124 | 9/1984 | Tagami et al. ........................ | 340/988 |
| 4,887,081 | 12/1989 | Iihashi et al. ........................ | 340/988 |
| 4,890,233 | 12/1989 | Ando et al. ........................... | 340/995 |

Primary Examiner—Jin F. Ng
Assistant Examiner—Brent A. Swarthout
Attorney, Agent, or Firm—Lane, Aitken & McCann

[57] ABSTRACT

A calibration apparatus of an angular-velocity detection sensor for detecting a heading of a vehicle which is used in a self-contained navigational system, comprising an angular-velocity detection unit for calculating an angular velocity from an output signal of the angular-velocity detection sensor; an integration unit for calculating a current heading of the vehicle by integrating the angular velocity and by adding the integrated angular velocity to the previous heading of the vehicle; a location and heading detection unit which estimates a location of the vehicle from the current heading calculated by the integration unit, a heading obtained by a magnetic sensor and from a distance obtained by a distance sensor and which compares the estimated location with road network data obtained from a road map memory to obtain an estimated heading of the vehicle; and a heading correction unit for calculating a difference between the heading of the integration unit and the heading of the location and heading detection unit and integrating the difference over a predetermined distance to obtain an error per unit distance, for calculating the difference or the error per unit distance, as a correction value for correcting the current heading of the integration unit, and for feeding the correction value back to the intergration unit. The current heading of the integration unit is corrected by subtracting the correction value from the current heading of the integration unit.

4 Claims, 6 Drawing Sheets

CALIBRATION APPARATUS OF ANGULAR VELOCITY SENSOR IN SELF-CONTAINED NAVIGATIONAL SYSTEM

FIELD OF THE INVENTION

The present invention relates to a calibration apparatus of an angular-velocity sensor (rate gyro) which is used in a self-contained navigational system as one of heading sensors.

DESCRIPTION OF THE PRIOR ART

A variety of automatic vehicle navigational systems have been developed and used to provide information about the actual location of a vehicle as it moves over streets. For example, one general approach to such navigational systems is known as "dead reckoning", in which the vehicle is tracked by advancing a "dead reckoned position" from measured distances and courses or headings. A system based upon dead reckoning principles may, for example, detect the distance travelled and heading of the vehicle using distance and heading sensors on the vehicle.

The heading sensor used in dead reckoning may comprise a magnetic sensor or turning-angle sensor. In the magnetic sensor, a reading error of more than 10° tends to occur due to the distortion of earth's magnetism and influence of external magnetic fields, and spurious magnetic fields associated with the vehicle have also to be compensated. In the turning-angle sensor, there is used a differential odmeter for detecting a difference of rotation between the left and right wheels. Since the turning-angle sensor detects the rotation of tires, it has its disadvantage in that there occur errors caused by a change or distortion in tire radius, slips and the like.

In order to improve the drawbacks, it has been proposed to replace the above described sensors with angular-velocity sensors such as optical fiber gyros, vibration gyros and coma-type gyros which detect directly rotational angular velocities. For example, in the optical fiber gyro, laser light is transmitted through an optical fiber ring in the clockwise direction and anticlockwise direction. If the optical fiber ring is rotated, then the lights in both directions become different in time to pass through the optical path. This time difference is detected as a phase difference.

The vibration gyro is one wherein a rotational angular velocity is detected by detecting a change of the vibration distribution of a particle vibrating in a container, since the particle disposed in rotational coordinates is subjected to Coriolis force.

The errors involved in the angular velocity detected by the angular-velocity sensor are relatively small. However, if an error is involved in an initial heading used in obtaining the angular velocity by integrating the sensor output, this error will be fixed thereafter. That is to say, even if the detected angular velocity is accurate, the distinctive features of the angular-velocity sensor cannot be utilized if the initial heading is inaccurate. On the other hand, if the vehicle heading is corrected to match with the heading obtained from the magnetic sensor, it will be subjected to the distortion of earth's magnetic field in that place. In addition, in a method wherein a vehicle is stopped on a road to match with the road heading on a map, stopping the vehicle is troublesome, and an accurate calibration cannot be performed since the method depends upon the position of the vehicle stopped on the road.

Moreover, there are some cases where an error occurs in the absolute value of an angular velocity detected, because of insufficient adjustment and deterioration of the signal processing systems of the angular-velocity sensor. That is, the scale factor of the angular-velocity sensor fluctuates. The error caused by this fluctuation in the scale factor does not appear when the vehicle moves in a straight line, but it appears each time the vehicle turns. Therefore, if the vehicle travels a large number of curves in the road, errors are then accumulated and interfere with dead reckoning.

Accordingly, it is an object of the present invention to provide an improved calibration apparatus which is capable of automatically calibrating the output of an angular-velocity sensor which is used in a self-contained navigational system using map matching.

SUMMARY OF THE INVENTION

Figure 1:
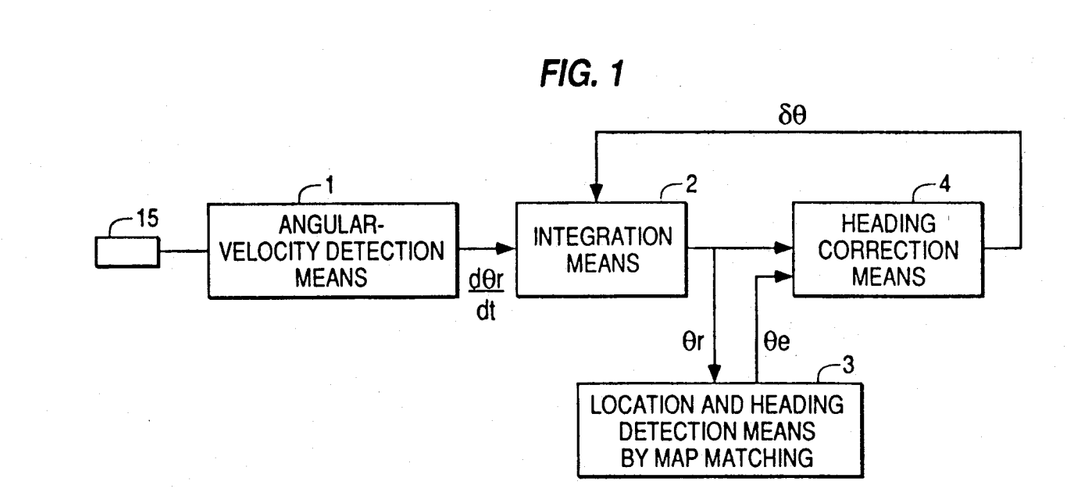
FIGS. 1 and 2 are block diagrams showing the principles of the present invention.

In order to achieve the above object, as shown in FIG. 1, a calibration apparatus of an angular-velocity detection sensor for detecting a heading of a vehicle, which sensor is used in a self-contained navigational system, comprises angular-velocity detection means 1 for calculating an angular velocity from an output signal of the angular-velocity detection sensor 15, and integration means 2 for calculating a current heading of the vehicle by integrating the angular velocity and by adding the integrated angular velocity to the previous heading of the vehicle. The calibration apparatus of angular-velocity detection sensor further comprises location and heading detection means 3 which estimates a location of the vehicle from the current heading calculated by the integration means, a heading obtained by a magnetic sensor and from a distance obtained by a distance sensor. The location and heading detecting means 3 then compares the estimated location with road network data obtained from a road map memory to obtain an estimated heading of the vehicle. In addition, there is provided heading correction means 4 for calculating a difference between the heading of the integration means and the heading of the location and heading detection means and integrating the difference over a predetermined distance to obtain an error per unit distance, for calculating the difference or the error per unit distance, as a correction value for correcting the current heading of the integration means, and for feeding the correction value back to the integration means.

According to the calibration apparatus of the angular-velocity sensor, the output of the angular-velocity detection sensor 15 is detected at all times and the angular velocity $d\theta r/dt$ is calculated by the angular-velocity detection means 1. The angular velocity $d\theta r/dt$ is then integrated and the integrated angular velocity is added to the previous heading of the vehicle by the integration means 2 to calculate a current heading $\theta r$ of the vehicle.

The current heading $\theta r$ of the vehicle is supplied as base data of map matching to the location and heading detection means 3. The heading output $\theta e$ obtained from the location and heading detection means 3 with the aid of the map matching is inputted to the heading correction means 4, together with the current heading $\theta r$ obtained from the integration means 2.

The heading correction means 4 calculates the difference between the heading output $\theta r$ of the integration means 2 and the heading output $\theta e$ of the location and heading detection means 3. If necessary, this difference is accumulated over the distances travelled by the vehicle. The reason that the difference is accumulated is that the accuracy of data is increased, since errors resulting from various factors are involved in the difference not accumulated.

Thereafter, the correction value $\delta\theta$ for correcting the heading output $\theta r$ of the integration means 2 is calculated from the difference or an accumulated value of the difference, and fed back to the integration means 2.

Since the integration means 2 corrects the current heading $\theta r$ with the correction value $\delta\theta$ and the corrected heading is supplied as base data of the map matching to the location and heading detection means 3, the accuracy of the map matching can be enhanced.

Figure 2:
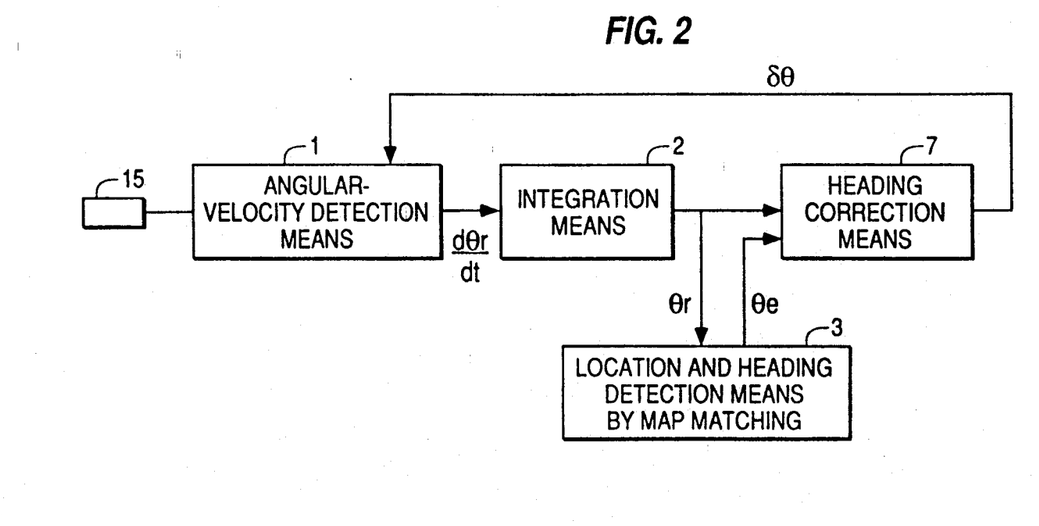

In addition, as shown in FIG. 2, in a self-contained navigational system wherein the location and heading of the vehicle on road are detected with the aid of location and heading detection means 3 by map matching, the calibration apparatus of the angular-velocity sensor according to the present invention comprises:

an angular-velocity detection sensor 15 for detecting a heading of the vehicle;

angular-velocity detection means 1 for calculating an angular velocity from an output signal of the angular-velocity detection sensor 15;

integration means 2 for calculating a current heading of the vehicle by integrating the angular velocity and by adding the integrated angular velocity to the previous heading of the vehicle; and heading correction means 7 which, when it has detected a turning of the vehicle, calculates a first change $\delta\theta r$ of a heading output $\theta r$ obtained from the integration means 2 and a second change $\delta\theta e$ of a heading output $\theta e$ obtained from the location and heading detection means 3, and which calculates a correction value $\delta\phi$ for correcting the angular velocity of the angular-velocity detection means 1, with the aid of the first and second changes $\delta\theta r$ and $\delta\theta e$ or accumulated values of the changes, and which feeds the correction value $\delta\phi$ back to the angular-velocity detection means 1.

The calibration apparatus shown in FIG. 2 is similar to that of FIG. 1 except the heading correction means 7.

When the heading correction means 7 has detected a turning of the vehicle, it calculates the first change $\delta\theta r$ (amount of rotation) of the heading output $\theta r$ and the second change $\delta\theta e$ of the heading output $\theta e$ before and after the turning. If necessary, these first and second changes are accumulated over the distances travelled by the vehicle. The reason that the changes are accumulated is that the accuracy of data is increased, since errors resulting from various factors are involved in the change not accumulated.

The correction value $\delta\phi$ for correcting the angular velocity of the angular-velocity detection means 1 is then calculated with the aid of the first and second changes $\delta\theta r$ and $\delta\theta e$ or accumulated values of the changes, and fed back to the angular-velocity detection means 1.

The angular-velocity detection means 1 corrects the scale factor of the angular velocity with the correction value $\delta\theta$, and the corrected angular velocity is supplied to the integration means 2. Since the output of the integration means 2 is supplied as base data of the map matching to the location and heading detection means 3, the accuracy of the map matching can be enhanced.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 3:
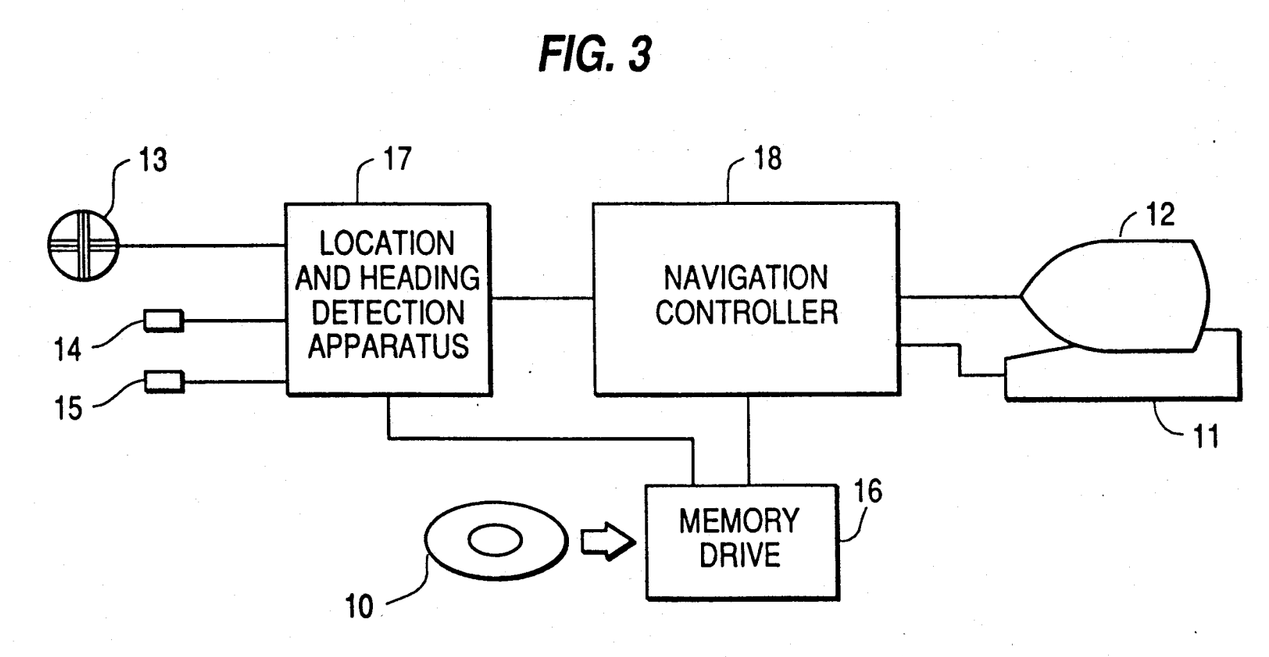
FIG. 3 is a block diagram showing a self-contained navigational system into which a calibration apparatus of an angular-velocity sensor according to the present invention may be incorporated.

Referring to FIG. 3, there is shown a self-contained navigational system into which a calibration apparatus of an angular-velocity sensor according to the present invention may be incorporated. The self-contained navigational system comprises a console 11, a display 12, a magnetic sensor 13, a distance sensor 14, an angular-velocity sensor 15, a road map memory 10 for storing map data and the like, and a memory drive 16 for reading data from the road map memory 10. The self-contained navigational system further comprises a location and heading detecting apparatus 17 which evaluates the probability of existence of a vehicle on each road and calculates the location and heading of the vehicle from the evaluation. The self-contained navigational system further comprises a navigation controller 18 which retrieves and reads a predetermined range of a road map, drives the display 18 and performs various arithmetic controls such as controls of the location and heading detecting apparatus 17.

The above described console 11 has a keyboard (not shown) which allows a vehicle operator to start and stop this self-contained navigational system, and to move a cursor on the picture screen of the display 12 and to scroll the road map displayed on the picture screen.

The road map memory 10 comprises a mass storage medium memory such as a CDROM, magnetic tape and like. In the road map memory 10, the road map is divided into mesh blocks, and data (map data) of route junctions (nodes) to detect a vehicle location at the unit of each mesh block stored. This road map data is used for graphic display and route calculation.

The display 12 comprises a CRT (cathode Ray Tube) and a crystalline panel, and displays textual and line graphic information such as road maps, vehicle location, recommended routes, vehicle heading and distance to a destination.

The magnetic sensor 13 detects an absolute angle of the heading of the vehicle as it moves over streets.

The angular-velocity sensor 15 comprises an optical fiber gyro, but it may comprise a vibration gyro or a mechanical type gyro.

The distance sensor 14 is used to detect distances travelled by the vehicle. For example, the distance sensor 14 can constitute a vehicle speed sensor which senses the speed of the vehicle, or one or more wheel sensors which sense the rotation of the wheels of the vehicle.

The navigation controller 18 receives information about vehicle locations from the location and heading detecting apparatus 17, and displays on the map the current location and destination of the vehicle. More specifically, the navigation controller 18 is constituted by a microcomputer (not shown), a graphic data processor (not shown) and a picture image processing memory (not shown), and performs the display of menus, retrieval of maps, switching of contraction scale, zoom scroll, display of the current location and heading of a vehicle, display of a destination or guide spots, and display of the heading and distance to an destination.

The location and heading detecting apparatus 17 integrates the distances detected by the distance sensor 14 and the headings detected by the magnetic sensor 13 and angular-velocity sensor 15, and calculates the location of the vehicle by comparing the integrated data with the map data that has been read by the memory drive 16, and outputs the location and heading of the vehicle.

Figure 4:
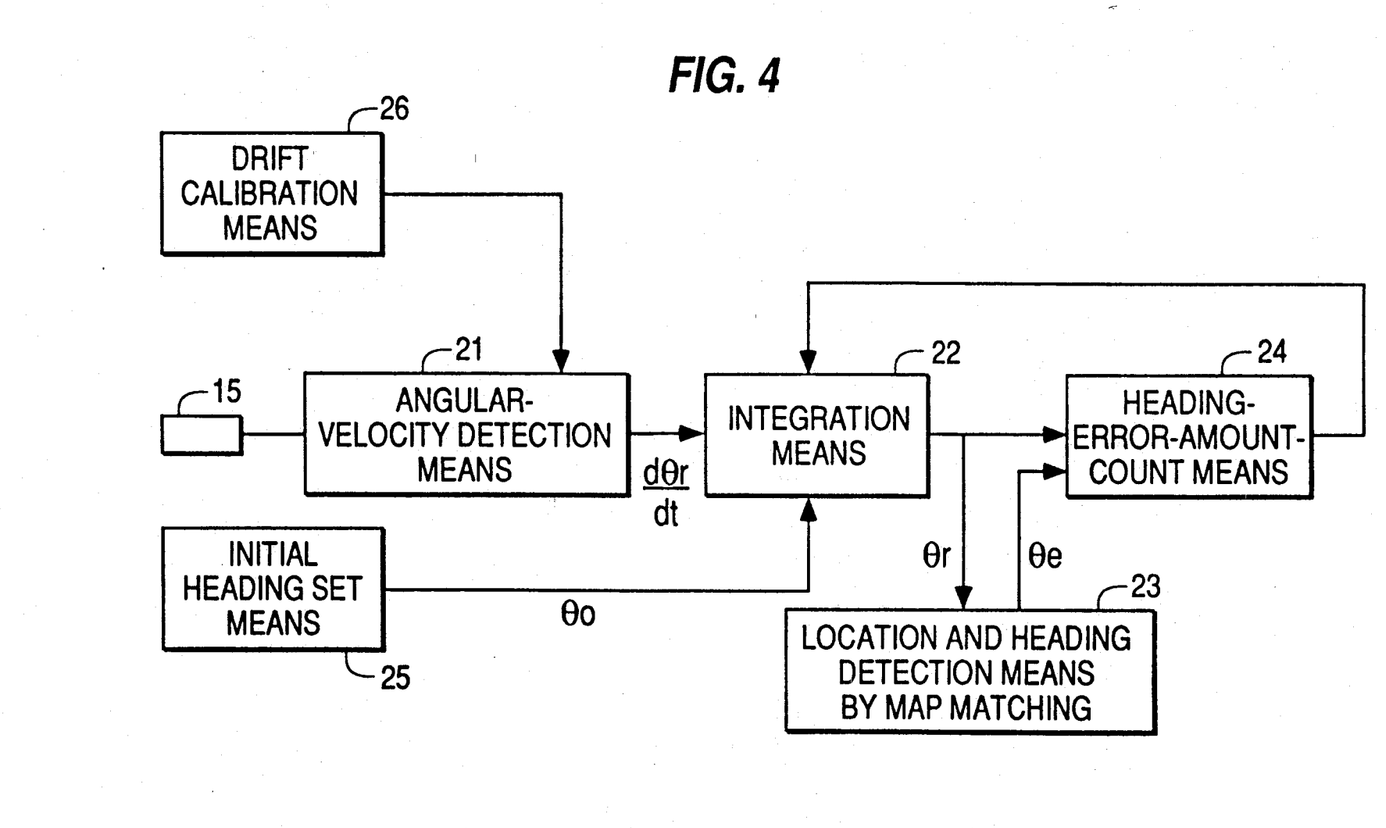
FIG. 4 is a block diagram showing the structure of a first embodiment of the calibration apparatus.

FIG. 4 shows the structure of the calibration apparatus of the angular-velocity sensor 15.

The calibration apparatus comprises angular-velocity detection means 21 for detecting the rotational angular velocity of the angular-velocity sensor 15, and integration means 22 for integrating the angular velocity each unit sampling times to calculate a heading angle and for adding the heading angle to the heading obtained at the previous sampling time to calculate a heading $\theta r$ at the current time.

The calibration apparatus further comprises location and heading detection means 23, heading-error-amount count means 24, initial-heading set means 25, and drift calibration means 26.

Figure 6:
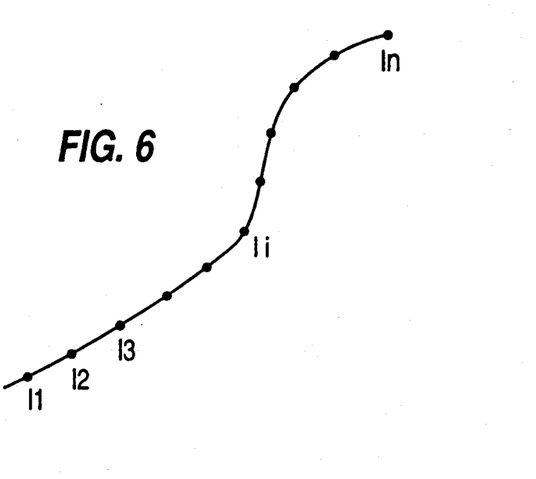
FIG. 6 schematically illustrates the interval of distances travelled by the vehicle.

The location and heading detection means 23 calculates repeatedly the similarity between the map data and the estimate location obtained from the heading output of the magnetic sensor 13 and distance output of the distance sensor 14, and determines a most probable vehicle location and heading on the road by map matching The heading-error-amount count means 24 compares the heading output $\theta r$ from the integration means 22 with the estimated heading output $\theta e$ (or heading of the estimated road) from the location and heading detection means 23, at intervals of unit travel distances $\delta l$ shown in FIG. 6. If the accumulation of the difference between the heading output $\theta r$ and the estimated heading output $\theta e$ is above a predetermined value, then the heading-error-amount count means 24 feeds a heading correcting output back to the integration means 22.

The initial-heading set means 25 sets an initial heading $\theta o$ of a vehicle with the aid of the magnetic sensor output or heading of the road, when the vehicle starts travelling.

The drift calibration means 26 calibrates an angular-velocity drift error of the angular-velocity sensor 15.

Figure 5:
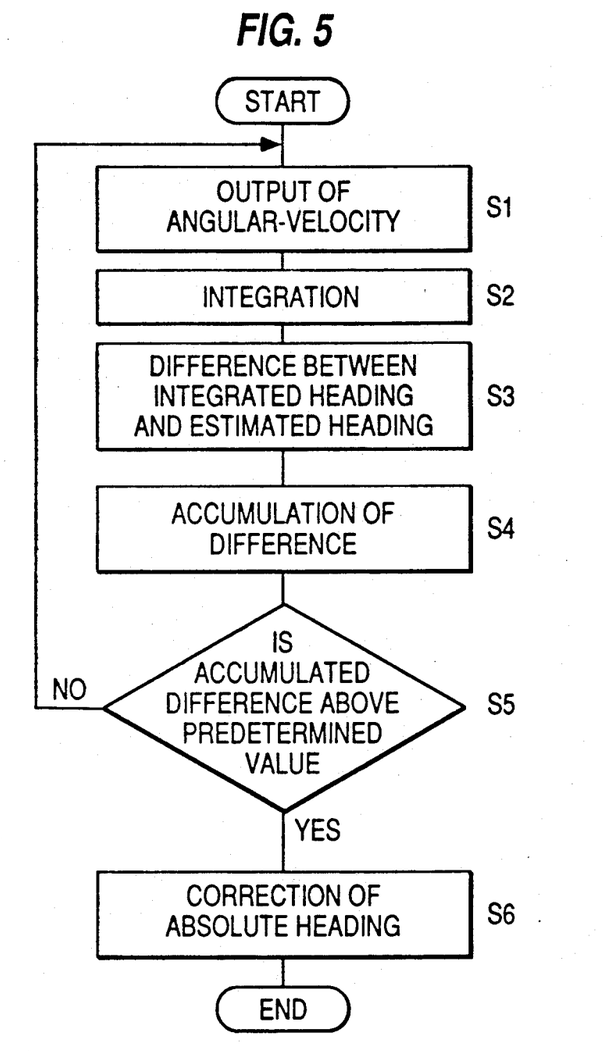
FIG. 5 is a flow diagram showing calibrating processes performed by the first embodiment of FIG. 4.

The calibrating operation of the angular-velocity sensor 15 constructed as shown in FIG. 4 will hereinafter be described with respect to FIG. 5.

The output $d\theta r/dt$ of the angular-velocity detection means 21 is calculated in step S1, and integrated in step S2 at intervals of predetermined clock times $\delta t$. The integrated output is added to the previous heading $\theta r'$ (initial heading is $\theta o$) to obtain the following present heading $\theta r$:

$$\theta r = \int_{t}^{t + \delta t} \frac{d\theta r}{dt} dt + \theta r'$$

Next, in step S3, there is obtained the difference between the heading $\theta e(li)$ obtained every travel distances $li$ ($i = 1, 2, \ldots,$ and $n$) shown in FIG. 6 by the location and heading detection means 23 and the heading $\theta r(li)$ that has been obtained in the step 2, and in step S4, the difference is accumulated by the following equation:

$$\delta\theta j(n) = \sum_{li}^{ln} \{\theta r(li) - \theta e(li)\}$$

The accumulation ($\delta\theta j(n)$) is continued until it becomes a predetermined value. If the accumulation ($\delta\theta j(n)$) becomes above the predetermined value, it is then stopped.

In step S5, it is determined if $\delta\theta j(n)$ is above the predetermined value. If yes, an error to one interval of travel distance $\delta l$ is calculated by the following equation:

$$\frac{\delta\theta j(n)}{n}$$

The error is subtracted from the heading $\theta r$ that has been obtained by the integration means 22. This heading ($\theta r - \delta\theta j(n)/n$) is supplied as $\theta r$ to the location and heading detection means 23, and the map matching is continued. If, on the other hand, $\delta\theta j(n)$ is not above the predetermined value, the step S5 then returns back to the step S1, and the above described accumulation is repeated.

Thus, if the accumulation of the difference (error) between the output of the angular-velocity sensor 15 and the heading obtained by the map matching becomes the predetermined value, then by subtracting the error from the heading obtained by the integration means 22, the angular-velocity sensor 15 can be calibrated so that a correct heading is obtained at all times.

Figure 7:
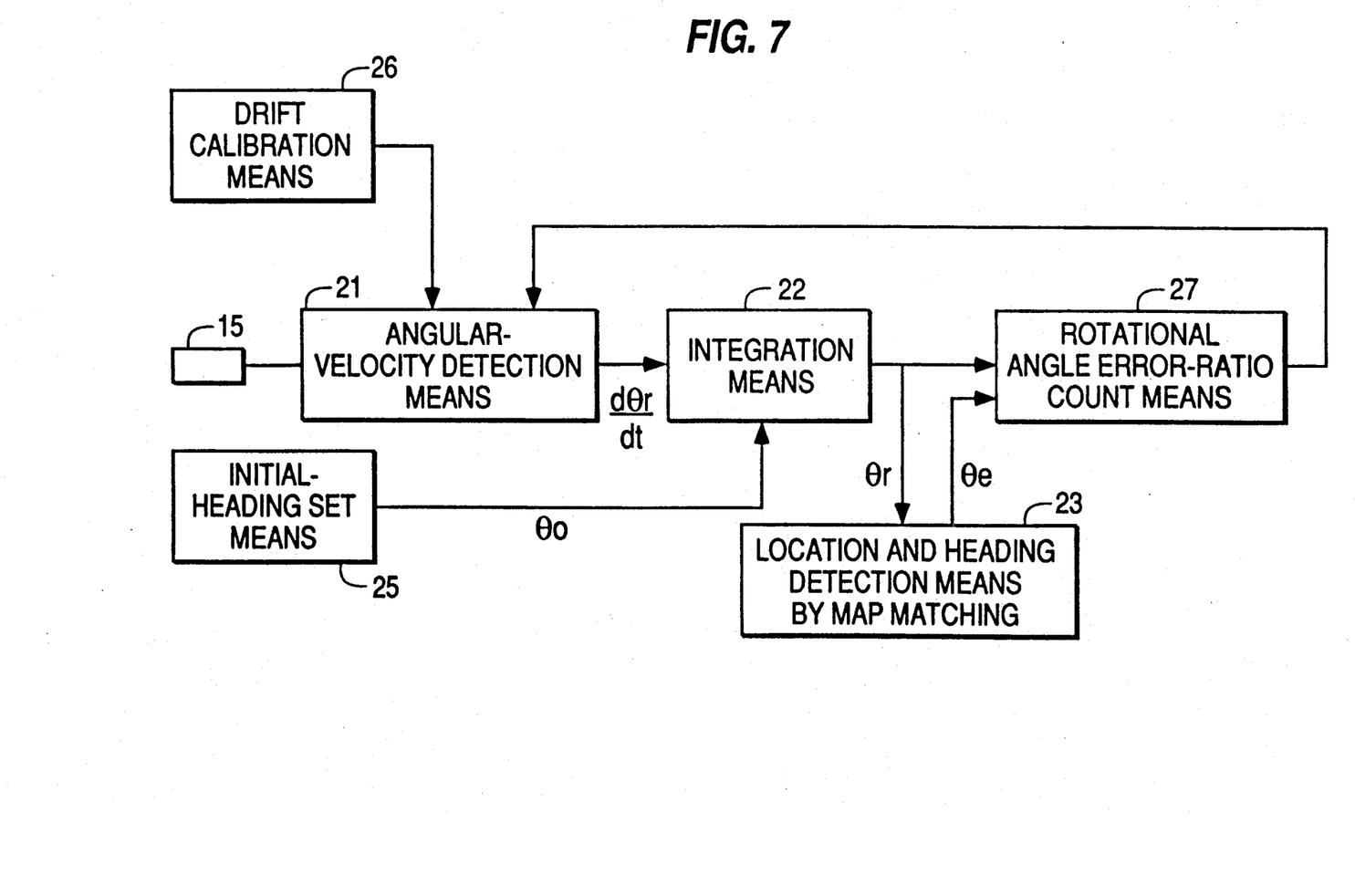
FIG. 7 is a block diagram showing the structure of a second embodiment of the calibration apparatus.

FIG. 7 shows a second embodiment of the calibration apparatus of the angular-velocity sensor according to the present invention.

As shown in FIG. 7, this embodiment is identical to the embodiment of FIG. 4, except that a rotational angle error-ratio count means 27 is provided instead of the heading-error-amount count means 24 and that the output of the rotational angle error-ratio count means 27 is fed back to the angular-velocity detection means 21.

If the rotational angle error-ratio count means 27 detects that the vehicle heading is rotated above a predetermined angle, then it calculates the following ratio:

$$\frac{|\delta\theta r| - |\delta\theta e|}{|\delta\theta e|}$$

where $|\delta\theta r|$ is an absolute value of the rotational angle $\delta\theta r$ calculated from the heading output $\theta r$ of the integration means 22, and $|\delta\theta e|$ is an absolute value of the rotational angle $\delta\theta r$ calculated from the heading output $\theta e$ of the location and heading detection means 23. The above described ratio is accumulated each time the angle above a predetermined value is detected. If the accumulated ratio becomes above the predetermined value, then it is fed back to the angular-velocity detection means 21 as a scale factor correcting output.

Figure 8:
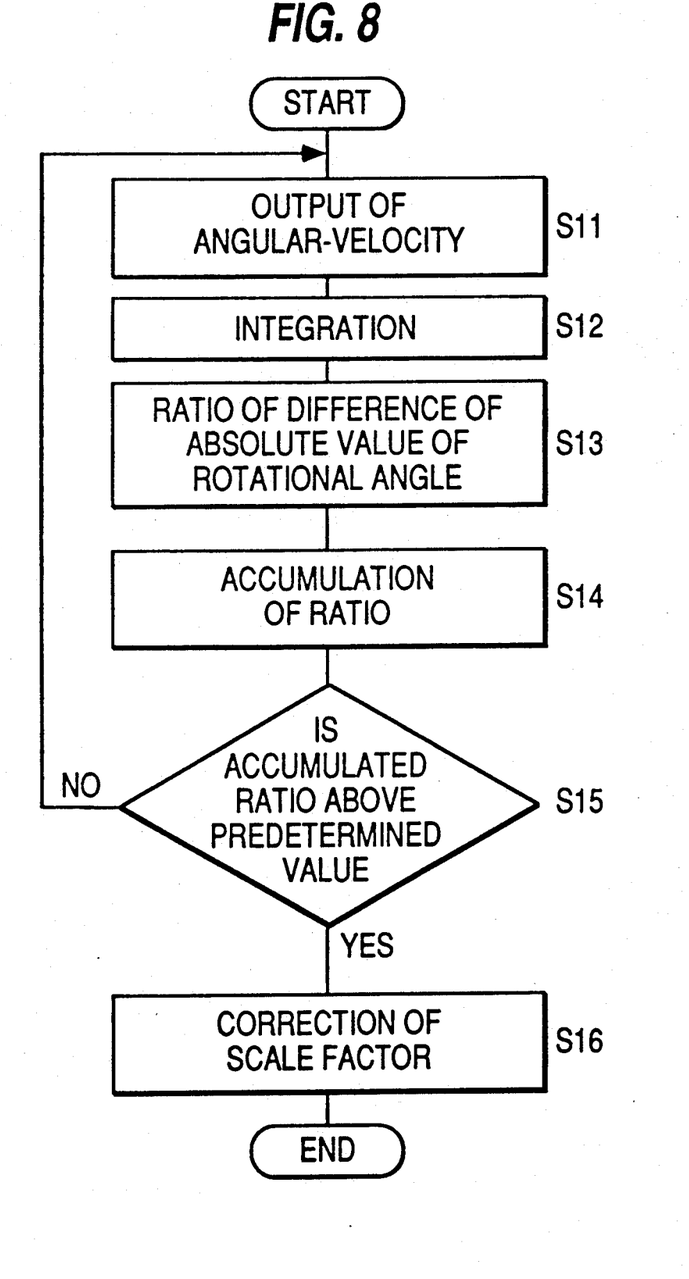
FIG. 8 is a flow diagram showing calibrating processes performed by the second embodiment of FIG. 7.

The correcting operation of the scale factor of the angular-velocity sensor 15 will hereinafter be described with respect to FIG. 8.

The output $d\theta r/dt$ of the angular-velocity detection means 21 is calculated in step S11, and integrated in step S12 at intervals of predetermined clock times $\delta t$. The integrated output is added to the previous heading $\theta r'$ (initial heading is $\theta o$) to calculate the following present heading $\theta r$:

$$\theta r = \int_{t}^{t + \delta t} \frac{d\theta r}{dt} dt + \theta r'$$

Next, in step S13, rotational angles $\theta r(t-1)$ and $\theta e(t-1)$ at the time the beginning of one curve in a road has been detected are obtained. The beginning of the curve can be detected, for example, by detecting that the output $d\theta r/dt$ of the angular-velocity detection means 21 or the differentiated value $d^2\theta r/dt^2$ is above a threshold. Rotational angles $\theta r(t)$ and $\theta e(t)$ at the time the end of the curve has been detected are also obtained. The end of the curve can be detected, for example, by detecting that the output $d\theta r/dt$ of the angular-velocity detection means 21 or the differentiated value $d^2\theta r/dt^2$ is below the threshold. The difference between $\theta r(t)$ and $\theta r(t-1)$ and the difference between $\theta e(t)$ and $\theta e(t-1)$ are obtained as follows:

$$\delta\theta r = \theta r(t) - \theta r(t-1)$$

$$\delta\theta e = \theta e(t) - \theta e(t-1)$$

If $\delta\theta r$ and $\delta\theta e$ are above a predetermined value, then the ratio of the difference between the absolute values is calculated by the following equation:

$$\frac{\delta\theta r - \delta\theta e}{\delta\theta e}$$

It is noted that the absolute values are used in the calculation of the above described ratio, in order that the fluctuations of the scale factors are prevented from being cancelled with each other at the left and right curves.

In step S14, the calculation of the ratio is repeated each time the vehicle travels each curve, and accumulated by the following equation:

$$\delta\phi(m) = \sum^{m} \frac{|\delta\theta r| - |\delta\theta e|}{|\delta\theta e|}$$

In step S15, it is determined if $\delta\theta(m)$ is above a predetermined value. If yes, the step S15 advances to step 16, in which the scale factor is corrected. The scale factor is corrected by dividing $d\theta r/dt$ by the following equation:

$$\frac{\delta\theta(m)}{m} + 1$$

where $\delta\phi(m)/m$ is an average value of $\delta\phi(m)$ to one curve. The scale factor may also be corrected by subtracting a value obtained by multiplying $d\theta r/dt$ by $\delta\phi(m)/m$, from $d\theta r/dt$. When $\delta\phi(m)/m$ is far below 1, the result of the former computation is nearly the same as that of the latter computation.

Therefore, even if the scale factor of the angular-velocity sensor 15 fluctuates, the fluctuation can be automatically calibrated by matching with the rotational angle obtained from the map matching each time the vehicles travels a curve in a road.

The present invention is not limited to the above described first and second embodiments. For example, if the first and second embodiments are used together, the effect of the calibration is further enhanced.

While certain representative embodiments and details have been shown for the purpose of illustrating the invention, it will be apparent to those skilled in this art that various changes and modifications may be made therein without departing from the scope of the invention.

What we claim is:

1. A calibration apparatus of an angular-velocity detection sensor for detecting a heading of a vehicle which is used in a self-contained navigational system, comprising:

angular-velocity detection means for calculating an angular velocity from an output signal of said angular-velocity detection sensor;

integration means for calculating a current heading of the vehicle by integrating said angular velocity and by adding the integrated angular velocity to the previous heading of the vehicle;

location and heading detection means which estimates a location of the vehicle from said current heading calculated by said integration means, a heading obtained by a magnetic sensor and from a distance obtained by a distance sensor and which compares the estimated location with road network data obtained from a road map memory to obtain an estimated heading of the vehicle; and heading correction means for calculating a difference between said current heading of said integration means and said estimated heading of said location and heading detection means and integrating said difference over a predetermined distance to obtain an error per unit distance, for calculating said difference or said error per unit distance, as a correction value for correcting said current heading of said integration means, and for feeding said correction value back to said integration means;

said current heading of said integration means being corrected by subtracting said correction value from said current heading of said integration means.

2. A calibration apparatus of an angular-velocity detection sensor for detecting a heading of a vehicle which is used in a self-contained navigational system, comprising:

angular-velocity detection means for calculating an angular velocity from an output signal of said angular-velocity detection sensor;

integration means for calculating a current heading of the vehicle by integrating said angular velocity and by adding the integrated angular velocity to the previous heading of the vehicle;

location and heading detection means which estimates a locations of the vehicle from said current heading calculated by said integration means, a heading obtained by a magnetic sensor and from a distance obtained by a distance sensor and which compares the estimated location with road network data obtained from a road map memory to obtain an estimated heading of the vehicle; and heading correction means which calculates a first change between heading outputs obtained from said integration means before and after a turning of the vehicle and a second change between heading outputs obtained from said location and heading detection means before and after the turning of the vehicle, and which calculates a correction value for correcting said angular velocity of said angular-velocity detection means, by performing a predetermined arithmetic operation on the basis of said first and second changes, and which feeds said correction value back to said angular-velocity detection means in which said angular velocity is corrected with said correction value.

3. A calibration apparatus as set forth in claim 1, which further comprises initial-heading set means for setting, when said vehicle starts travelling on a road, an output of said magnetic sensor or a heading of the road as an initial heading of said vehicle.

4. A calibration apparatus as set forth in claim 2, which further comprises initial-heading set means for setting, when said vehicle start travelling on a road, an output of said magnetic sensor or a heading of the road as an initial heading of said vehicle, and drift calibration means for calibrating an angular-velocity drift error of said angular-velocity sensor.

* * * * *